United States Patent
Mo et al.

(10) Patent No.: US 10,873,530 B2
(45) Date of Patent: Dec. 22, 2020

(54) METHOD FOR CONTROLLING DATA TRANSMISSION, DEVICE, AND STORAGE MEDIUM

(71) Applicant: GUANGDONG OPPO MOBILE TELECOMMUNICATIONS CORP., LTD., Dongguan, Guangdong (CN)

(72) Inventors: Ruihong Mo, Dongguan (CN); Zhiyong Lin, Dongguan (CN); Mei Liu, Dongguan (CN); Jun Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 59 days.

(21) Appl. No.: 16/129,131

(22) Filed: Sep. 12, 2018

(65) Prior Publication Data

US 2019/0132248 A1    May 2, 2019

(30) Foreign Application Priority Data

Oct. 30, 2017   (CN) .......................... 2017 1 1030400

(51) Int. Cl.
*H04L 12/803* (2013.01)
*H04W 40/00* (2009.01)
(Continued)

(52) U.S. Cl.
CPC ............ *H04L 47/122* (2013.01); *H04L 45/24* (2013.01); *H04L 47/724* (2013.01);
(Continued)

(58) Field of Classification Search
CPC ..... H04L 47/122; H04L 45/24; H04L 47/724; H04L 45/28; H04W 40/00; H04W 28/26;
(Continued)

(56) References Cited

U.S. PATENT DOCUMENTS 6,996,065 B2   2/2006 Kodialam
9,419,632 B1   8/2016 Lee
(Continued)

FOREIGN PATENT DOCUMENTS

CN       101949953 A    1/2011
CN       102185906 A    9/2011
(Continued)

OTHER PUBLICATIONS

Notice of Allowance of the Chinese application No. 201711030400.7, dated Sep. 6, 2019.
(Continued)

*Primary Examiner* — Afshawn M Towfighi
(74) *Attorney, Agent, or Firm* — Ladas & Parry LLP

(57) ABSTRACT

A method for controlling data transmission, device, and storage medium are provided. The method for controlling data transmission is applied to a first device and the method includes that a request for data transmission is sent; a main transmission path that fed back by a second device based on the request is received, here, the main transmission path is generated by connecting M sink nodes between the first device and the second device and M is an integer greater than 1; and the data transmission with the second device is performed according to the main transmission path.

17 Claims, 9 Drawing Sheets

(51) Int. Cl.
*H04L 12/707* (2013.01)
*H04L 12/913* (2013.01)
*H04W 28/02* (2009.01)
*H04W 28/26* (2009.01)
*H04L 12/703* (2013.01)

(52) U.S. Cl.
CPC ... *H04W 28/0284* (2013.01); *H04W 28/0289* (2013.01); *H04W 28/26* (2013.01); *H04W 40/00* (2013.01); *H04L 45/28* (2013.01)

(58) Field of Classification Search
CPC ......... H04W 28/0289; H04W 28/0284; H04W 28/06
See application file for complete search history.

(56) References Cited

U.S. PATENT DOCUMENTS

| | | | |
|---|---|---|---|
| 9,755,950 | B2 | 9/2017 | Butler et al. |
| 2005/0243736 | A1 | 11/2005 | Faloutsos |
| 2008/0175144 | A1* | 7/2008 | Lu .................. H04L 45/02 370/228 |
| 2012/0102223 | A1 | 4/2012 | Zhang |
| 2015/0113164 | A1 | 4/2015 | Butler et al. |

FOREIGN PATENT DOCUMENTS

| | | | |
|---|---|---|---|
| CN | 103096297 | A | 5/2013 |
| CN | 104185240 | A | 12/2014 |
| CN | 105148516 | A | 12/2015 |
| CN | 105376806 | A | 3/2016 |
| CN | 105450732 | A | 3/2016 |
| CN | 107026793 | A | 8/2017 |
| CN | 107104897 | A | 8/2017 |
| CN | 107111927 | A | 8/2017 |
| CN | 107294830 | A | 10/2017 |
| CN | 107734556 | A | 2/2018 |

OTHER PUBLICATIONS

International Search Report in international application No. PCT/CN2018/108465, dated Dec. 28, 2018.
Written Opinion of the International Search Authority in international application No. PCT/CN2018/108465, dated Dec. 28, 2018.
European Search Report in European application No. 18198204.2, dated Jan. 31, 2019.
Office Action of the Indian application No. 201814040312, dated May 13, 2020.
First Office Action of the Chinese application No. 201711030400.7, dated Mar. 28, 2019.
Second Office Action of the Chinese application No. 201711030400.7, dated May 23, 2019.

* cited by examiner

METHOD FOR CONTROLLING DATA TRANSMISSION, DEVICE, AND STORAGE MEDIUM

CROSS-REFERENCE TO RELATED APPLICATION

The present application claims benefit of Chinese Patent Application 201711030400.7, filed on Oct. 30, 2017, the contents of which are hereby incorporated by reference in its entirety.

BACKGROUND

With extensive popularization and application of mobile terminals such as mobile phones, tablet computers and the like, the mobile terminals may support more and more applications and have more and more powerful functions. The mobile terminals are developed towards directions of diversification and personalization and become indispensable electronic equipment in users' lives.

At present, game use and game battle are relatively important user scenarios of a mobile terminal. A user attaches great importance to a speed and performance during the game use. However, the user may get offline because of a poor network in many cases, which brings reduction in a user experience. Therefore, the problem of how to optimize a network environment is urgent to be solved.

SUMMARY

Embodiments of the present disclosure provide a method for controlling data transmission, device, and storage medium.

In a first aspect, the embodiments of the present disclosure provide a method for controlling data transmission, which is applied to a first device and may include that a request for data transmission is sent; a main path fed back by a second device based on the request is received, here, the main transmission path is generated by connecting M sink nodes between the first device and the second device and M is an integer greater than 1; and the data transmission with the second device is performed according to the main transmission path.

In a second aspect, the embodiments of the present disclosure provide a method for controlling data transmission, which may include that M sink nodes between a first device and a second device are determined, here, M is an integer greater than 1; the M sink nodes are connected to generate a main transmission path between the first device and the second device; and acceleration is started through the main transmission path to perform data transmission between the first device and the second device.

In a third aspect, the embodiments of the present disclosure provide a device for controlling data transmission, which is for use in a first device and may include a processor and a memory storing a computer program that when executed by the processor, cause the processor to send a request for data transmission; receive a main path fed back by a second device based on the request, here, the main transmission path is generated by connecting M sink nodes between the first device and the second device and M is an integer greater than 1; and perform the data transmission with the second device according to the main transmission path.

In a fourth aspect, the embodiments of the present disclosure provide a device for controlling data transmission, which may include a first determination unit, configured to determine M sink nodes between a first device and a second device, here, M is an integer greater than 1; a connection unit, configured to connect the M sink nodes to generate a main transmission path between the first device and the second device; and a first acceleration unit, configured to start acceleration through the main transmission path to perform data transmission between the first device and the second device.

In a fifth aspect, the embodiments of the present disclosure provide a service platform, which may include a processor and a memory storing a computer program that when executed by the processor, cause the processor to determine M sink nodes between a first device and a second device, here, M is an integer greater than 1; connect the M sink nodes to generate a main transmission path between the first device and the second device; and start acceleration through the main transmission path to perform data transmission between the first device and the second device.

In a sixth aspect, the embodiments of the present disclosure provide a non-transitory computer-readable storage medium having stored thereon a computer program that when executed by a processor, cause the processor to implement the method for controlling data transmission described in the first aspect or the second aspect of the embodiments of the present disclosure.

In a seventh aspect, the embodiments of the present disclosure provide a computer program product including a non-transitory computer-readable storage medium storing a computer program that when executed by a processor, cause the processor to implement the method for controlling data transmission described in the first aspect or the second aspect of the embodiments of the present disclosure. The computer program product may be a software installation package.

BRIEF DESCRIPTION OF DRAWINGS

In order to describe the technical solutions in the embodiments of the present disclosure or a related art more clearly, the drawings required to be used in descriptions about the embodiments or the related art will be simply introduced below. It is apparent that the drawings in the following descriptions are only some embodiments of the present disclosure. Those of ordinary skilled in the art may further obtain other drawings according to these drawings without creative work.

DETAILED DESCRIPTION

Figure 1A:
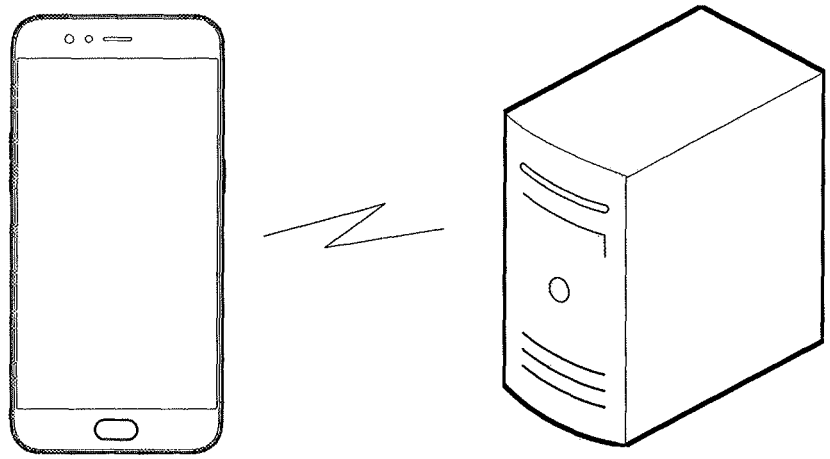
FIG. 1A is a network architecture diagram of a system for controlling data transmission according to an embodiment of the present disclosure.

In order to make the solutions of the present disclosure better understood by those skilled in the art, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

Terms "first", "second" and the like in the specification, claims and drawings of the present disclosure are adopted not to describe a specific sequence but to distinguish different objects. In addition, terms "include" and "have" and any transformation thereof are intended to cover nonexclusive inclusions. For example, a process, method, system, product or equipment including a series of operations or units is not limited to the operations or units which are listed, but may optionally further include operations or units which are not listed or optionally further include other operations or units intrinsic to the process, the method, the system, the product or the equipment.

"Embodiment" mentioned in the present disclosure means that a specific feature, structure or characteristic described in combination with the embodiment may be included in at least one embodiment of the present disclosure. Appearance of this phrase at each position in the specification may not always refer to the same embodiment as well as an independent or alternative embodiment mutually exclusive with the other embodiments. It is explicitly and implicitly understood by those skilled in the art that the embodiments described in the present disclosure may be combined with the other embodiments.

The embodiments of the disclosure provide a method for controlling data transmission, device, and storage medium.

At least some embodiments of the disclosure provide a method for controlling data transmission, the method being applied to a first device and the method comprising: sending a request for data transmission; receiving a main transmission path that fed back by a second device based on the request, the main transmission path being generated by connecting M sink nodes between the first device and the second device and M being an integer greater than 1; and performing the data transmission with the second device according to the main transmission path.

According to at least some embodiments, there are N transmission paths between the first device and the second device, each of the N transmission paths comprises a plurality of sink nodes and has a performance evaluation value, and N is an integer greater than 1; wherein the M sink nodes between the first device and the second device are the plurality of sink nodes in a transmission path, that has a maximum performance evaluation value, of the N transmission paths.

According to at least some embodiments, the performance evaluation value of each transmission path is determined according to performance parameters of the plurality of sink nodes in the transmission path.

According to at least some embodiments, the performance parameters comprise at least one of a data receiving and sending frequency, a packet loss rate, an uplink data transmission rate, a downlink data transmission rate, a bearing bandwidth, the number of access users, or the number of antennas.

According to at least some embodiments, the method further comprising: when a network state of the first device does not meet a preset condition, receiving an auxiliary transmission path fed back by the second device, and performing the data transmission with the second device according to the auxiliary transmission path; wherein the auxiliary transmission path is determined according to a backbone path between the first device and the second device and P backup sink nodes between the first device and the second device, P is a positive integer; the backbone path is a path between the second device and a previous sink node of a main congested sink node in the main transmission path, the main congested sink node is one of the M sink nodes which has the highest degree of congestion in the main transmission path; the P backup sink nodes are P backup sink node between the previous sink node of the main congested sink node and the first device.

According to at least some embodiments, the request for data transmission includes a configuration parameter of a target game; and receiving the main transmission path that fed back by the second device based on the request comprises: receiving the main transmission path that fed back by the second device according to the configuration parameter, the main transmission path is generated by connecting the M sink nodes, which are determined according to a network resource parameter, between the first device and the second device, the network resource parameter is determined according to the configuration parameter.

According to at least some embodiments, performing the data transmission with the second device according to the main transmission path comprises: establishing a communication connection with the second device according to the main transmission path to implement the data transmission with the second device.

According to at least some embodiments, the first device is a mobile terminal, and the second device is a device for providing or forwarding services to the mobile terminal.

At least some embodiments of the disclosure provide a device for controlling data transmission, the device being for use in a first device and the device comprising: a processor and a memory storing a computer program that when executed by the processor, cause the processor to send a request for data transmission; receive a main transmission path that fed back by a second device based on the request, the main transmission path being generated by connecting M sink nodes between the first device and the second device, and M being an integer greater than 1; and perform the data transmission with the second device according to the main transmission path.

According to at least some embodiments, there are N transmission paths between the first device and the second device, each of the N transmission paths comprises a plurality of sink nodes and has a performance evaluation value, N being an integer greater than 1; wherein the M sink nodes between the first device and the second device are the plurality of sink nodes in a transmission path, that has a maximum performance evaluation value, of the N transmission paths.

According to at least some embodiments, the performance evaluation value of each transmission path is determined according to performance parameters of the plurality of sink nodes in the transmission path.

According to at least some embodiments, the performance parameters comprise at least one of a data receiving and sending frequency, a packet loss rate, an uplink data transmission rate, a downlink data transmission rate, a bearing bandwidth, the number of access users, or the number of antennas.

According to at least some embodiments, the processor is further configured, when a network state of the first device does not meet a preset condition, receive an auxiliary transmission path fed back by the second device, and perform the data transmission with the second device according to the auxiliary transmission path; wherein the auxiliary transmission path is determined according to a backbone path between the first device and the second device and P backup sink nodes between the first device and the second device, P is a positive integer; the backbone path is a path between the second device and a previous sink node of a main congested sink node in the main transmission path, the main congested sink node is one of the M sink nodes which has the highest degree of congestion in the main transmission path; the P backup sink nodes are P backup sink node between the previous sink node of the main congested sink node and the first device;

According to at least some embodiments, the request for data transmission includes a configuration parameter of a target game; and the processor is further configured to receive the main transmission path that fed back by the second device according to the configuration parameter, the main transmission path is generated by connecting the M sink nodes, which are determined according to a network resource parameter, between the first device and the second device, the network resource parameter is determined according to the configuration parameter.

According to at least some embodiments, the processor is further configured to establish a communication connection with the second device according to the main transmission path to implement the data transmission with the second device.

According to at least some embodiments, the first device is a mobile terminal, and the second device is a device for providing or forwarding services to the mobile terminal.

At least some embodiments of the disclosure provide a non-transitory computer-readable storage medium having stored thereon a computer program that when executed by a processor, cause the processor to implement a method for controlling data transmission, the method comprising: sending a request for data transmission; receiving a main transmission path that fed back by a second device based on the request, the main transmission path being generated by connecting M sink nodes between the first device and the second device, and M being an integer greater than 1; and performing the data transmission with the second device according to the main transmission path.

At least some embodiments of the disclosure provide a method for controlling data transmission, the method comprising: determining M sink nodes between a first device and a second device, M being an integer greater than 1; connecting the M sink nodes to generate a main transmission path between the first device and the second device; and starting acceleration through the main transmission path to perform data transmission between the first device and the second device.

According to at least some embodiments, determining the M sink nodes between the first device and the second device comprises: determining N transmission paths between the first device and the second device, each of the N transmission paths comprising multiple sink nodes and N being an integer greater than 1; performing performance evaluation on each of the N transmission paths to obtain N evaluation values; and determining the transmission path corresponding to a maximum of the N evaluation values, and determining the multiple sink node in the transmission path corresponding to the maximum of the N evaluation values as the M sink nodes.

According to at least some embodiments, performing the performance evaluation on each of the N transmission paths comprises: acquiring performance parameters of the multiple sink nodes in a transmission path i, wherein the transmission path i is any one of the N transmission paths; and performing performance evaluation on the transmission path i according to the performance parameters.

According to at least some embodiments, each of the multiple sink node corresponds to multiple performance parameters and each of the multiple performance parameters corresponds to a weight value, performing the performance evaluation on the transmission path i according to the performance parameters comprises: for each of the multiple sink nodes in the transmission path i, determining an evaluation value of each of the multiple sink nodes by performing a weighting operation on each of the multiple performance parameters and a weight value corresponding to each of the multiple performance parameters; and determining an average of the evaluation values of the multiple sink nodes in the transmission path i as an evaluation value of the transmission path i.

According to at least some embodiments, the performance parameters comprise at least one of a data receiving and sending frequency, a packet loss rate, an uplink data transmission rate, a downlink data transmission rate, a bearing bandwidth, the number of access users, or the number of antennas.

According to at least some embodiments, the method further comprises: detecting whether a network state of the second device meets a preset condition; when the network state does not meet the preset condition, determining a main congested sink node in the main transmission path, the main congested sink node being one of the M sink nodes which has the highest degree of congestion in the main transmission path; determining P backup sink nodes between a previous sink node of the main congested sink node and the second device, and reserving as a backbone path a path between the first device and the previous sink node of the main congested sink node in the main transmission path, P being a positive integer; generating an auxiliary transmission path between the first device and the second device according to the backbone path and the P backup sink nodes; and starting acceleration through the auxiliary transmission path to perform data transmission between the first device and the second device.

According to at least some embodiments, the method further comprises: receiving a configuration parameter of a target game from the second device; and determining a network resource parameter of the second device according to the configuration parameter, determining the M sink nodes between the first device and the second device comprises: determining the M sink nodes between the first device and the second device according to the network resource parameter.

According to at least some embodiments, the second device is a mobile terminal, and the first device is a device for providing or forwarding services to the mobile terminal.

The embodiments of the disclosure provide a device for controlling data transmission, comprising: a first determination unit, configured to determine M sink nodes between a first device and a second device, M being an integer greater than 1; a connection unit, configured to connect the M sink nodes to generate a main transmission path between the first device and the second device; and a first acceleration unit, configured to start acceleration through the main transmission path to perform data transmission between the first device and the second device.

According to at least some embodiments, the first determination unit comprises: a first determination module, configured to determine N transmission paths between the first device and the second device, each of the N transmission paths comprising multiple sink nodes and N being an integer greater than 1; a first evaluation module, configured to perform performance evaluation on each of the N transmission paths to obtain N evaluation values; and a second determination module, configured to determine the multiple sink node in the transmission path corresponding to the maximum of the N evaluation values as the M sink nodes.

According to at least some embodiments, the first evaluation module comprises: an acquisition module, configured to acquire performance parameters of the multiple sink nodes in a transmission path i, the transmission path i is any one of the N transmission paths; and a second evaluation module, configured to perform performance evaluation on the transmission path i according to the performance parameters.

According to at least some embodiments, each of the multiple sink node corresponds to multiple performance parameters and each of the multiple performance parameters corresponds to a weight value, the second evaluation module is further configured to: for each of the multiple sink nodes in the transmission path i, determine an evaluation value of each of the multiple sink nodes by performing a weighting operation on each of the multiple performance parameters and a weight value corresponding to each of the multiple performance parameters; and determine an average of the evaluation values of the multiple sink nodes in the transmission path i as an evaluation value of the transmission path i.

According to at least some embodiments, the performance parameters comprise at least one of a data receiving and sending frequency, a packet loss rate, an uplink data transmission rate, a downlink data transmission rate, a bearing bandwidth, the number of access users, or the number of antennas.

According to at least some embodiments, the device further comprises: a detection unit, configured to detect whether a network state of the second device meets a preset condition; a second determination unit, configured to, when the network state does not meet the preset condition, determine a main congested sink node in the main transmission path, the main congested sink node being one of the M sink nodes which has the highest degree of congestion in the main transmission path; determine P backup sink nodes between a previous sink node of the main congested sink node and the second device, and reserve as a backbone path a path between the first device and the previous sink node of the main congested sink node in the main transmission path, P being a positive integer; a generation unit, configured to generate an auxiliary transmission path between the first device and the second device according to the backbone path and the P backup sink nodes; and a second acceleration unit, configured to start acceleration through the auxiliary transmission path to perform data transmission between the first device and the second device.

According to at least some embodiments, the device further comprises: a receiving unit, configured to receive a configuration parameter of a target game from the second device; and a third determination unit, configured to determine a network resource parameter of the second device according to the configuration parameter; accordingly, the first determination unit is further configured to determine the M sink nodes between the first device and the second device according to the network resource parameter.

According to at least some embodiments, the second device is a mobile terminal, and the first device is a device for providing or forwarding services to the mobile terminal.

At least some embodiments of the disclosure provide a device for controlling data transmission, comprising: a processor and a memory storing a computer program that when executed by the processor, cause the processor to: determine M sink nodes between a first device and a second device, M being an integer greater than 1; connect the M sink nodes to generate a main transmission path between the first device and the second device; and start acceleration through the main transmission path to perform data transmission between the first device and the second device.

According to at least some embodiments, the processor is further configured to: determine N transmission paths between the first device and the second device, each of the N transmission paths comprising multiple sink nodes and N being an integer greater than 1; perform performance evaluation on each of the N transmission paths to obtain N evaluation values; and determine the transmission path corresponding to a maximum of the N evaluation values, and determine the multiple sink node in the transmission path corresponding to the maximum of the N evaluation values as the M sink nodes.

According to at least some embodiments, the processor is further configured to: acquire performance parameters of the multiple sink nodes in a transmission path i, wherein the transmission path i is any one of the N transmission paths; and perform performance evaluation on the transmission path i according to the performance parameters.

According to at least some embodiments, each of the multiple sink node corresponds to multiple performance parameters, and each of the multiple performance parameters corresponds to a weight value, the processor is further configured to: for each of the multiple sink nodes in the transmission path i, determine an evaluation value of each of the multiple sink nodes by performing a weighting operation on each of the multiple performance parameters and a weight value corresponding to each of the multiple performance parameters; and determine an average of the evaluation values of the multiple sink nodes in the transmission path i as an evaluation value of the transmission path i.

According to at least some embodiments, the performance parameters comprise at least one of a data receiving and sending frequency, a packet loss rate, an uplink data transmission rate, a downlink data transmission rate, a bearing bandwidth, the number of access users, or the number of antennas.

According to at least some embodiments, the processor is further configured to: detect whether a network state of the second device meets a preset condition; when the network state does not meet the preset condition, determine a main congested sink node in the main transmission path, the main congested sink node being one of the M sink nodes which has the highest degree of congestion in the main transmission path; determine P backup sink nodes between a previous sink node of the main congested sink node and the second device, and reserve as a backbone path a path between the first device and the previous sink node of the main congested sink node in the main transmission path, P being a positive integer; generate an auxiliary transmission path between the first device and the second device according to the backbone path and the P backup sink nodes; and start acceleration through the auxiliary transmission path to perform data transmission between the first device and the second device.

According to at least some embodiments, the processor is further configured to: receive a configuration parameter of a target game from the second device; determine a network resource parameter of the second device according to the configuration parameter, and determine the M sink nodes between the first device and the second device according to the network resource parameter.

According to at least some embodiments, the second device is a mobile terminal, and the first device is a device for providing or forwarding services to the mobile terminal.

The embodiments of the disclosure provide a computer-readable storage medium having stored thereon a computer program that when executed by a processor, cause the processor to implement a method for controlling data transmission, the method comprising: determining M sink nodes between a first device and a second device, M being an integer greater than 1; connecting the M sink nodes to generate a main transmission path between the first device and the second device; and starting acceleration through the main transmission path to perform data transmission between the first device and the second device.

A mobile terminal involved in the embodiments of the present disclosure may include various kinds of handheld equipment, vehicle-mounted equipment, wearable equipment, computing equipment or other processing equipment connected to a wireless modem, which has a wireless communication function, and various forms of User Equipment (UE), Mobile Station (MS) and terminal device and the like. A device for providing or forwarding services to the mobile terminal, involved in the embodiments of the present disclosure, may be a service platform. The service platform may be a server or other terminal devices. For example, the service may be a server for a third-party application or a server for an operator.

Figure 1B:
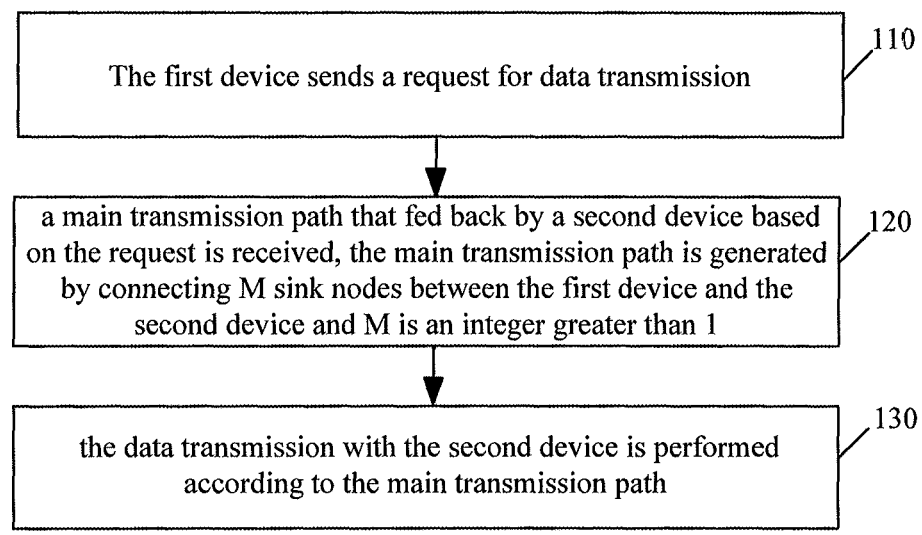
FIG. 1B is a flowchart of a method for controlling data transmission according to an embodiment of the present disclosure.

In a specific application, a communication connection may be established by the mobile terminal between the mobile terminal and the service platform and but not only receive data sent by the service platform and but also send data of the mobile terminal, and the data may include, but not limited to image data, video data, voice data, text data and the like. Therefore, the mobile terminal implements data interaction with the service platform. However, when a network rate is relatively low, there may exist conditions of lag, disconnection or the like of a video, so that a user experience is reduced. Therefore, as illustrated in FIG. 1A, the embodiments of the present disclosure provide a network architecture diagram of a system for controlling data transmission for a method for controlling data transmission. Here, the mobile terminal establishes the communication connection with the service platform. On the basis of the system for controlling data transmission illustrated in FIG. 1A, the embodiments of the present disclosure provide a method for controlling data transmission, as illustrated in FIG. 1B. The method may be applied to a first device and may include the following operations.

At block 110, the first device sends a request for data transmission.

Here, the first device may be a mobile terminal. In some embodiments, the request may be, for example, a request for game acceleration that sent by the mobile terminal when a user plays a game on the mobile terminal and the user desires the mobile terminal to implement fast data transmission.

At block 120, a main transmission path that fed back by a second device based on the request is received, the main transmission path is generated by connecting M sink nodes between the first device and the second device and M is an integer greater than 1.

In some embodiments, there are N transmission paths between the first device and the second device, each of the N transmission paths comprises a plurality of sink nodes and has a performance evaluation value, and N is an integer greater than 1. The M sink nodes between the first device and the second device are the plurality of sink nodes in a transmission path, that has a maximum performance evaluation value, of the N transmission paths.

In some embodiments, the performance evaluation value of each transmission path is determined according to performance parameters of the plurality of sink nodes in the transmission path.

In some embodiments, each of the plurality of sink node corresponds to a plurality of performance parameters and each of the plurality of performance parameters corresponds to a weight value. Each sink node has an evaluation value that is determined by performing a weighting operation on each of the plurality of performance parameters corresponding to the sink node and a weight value corresponding to the performance parameter, and a performance evaluation value of each transmission path is an average of the evaluation values of the plurality of sink nodes in the transmission path.

At block 130, the data transmission with the second device is performed according to the main transmission path.

Here, a communication connection with the second device is established according to the main transmission path to implement the data transmission with the second device.

In some embodiments, in the block 110, the request for data transmission may include a configuration parameter of a target game. The main transmission path that fed back by the second device based on the request is received comprises: the main transmission path that fed back by the second device according to the configuration parameter is received, the main transmission path is generated by connecting the M sink nodes, which are determined according to a network resource parameter, between the first device and the second device, the network resource parameter is determined according to the configuration parameter.

In some embodiments, after block 130, the method of the embodiments of the present disclosure may further include when a network state of the first device does not meet a preset condition, an auxiliary transmission path fed back by the second device is received, and the data transmission with the second device is performed according to the auxiliary transmission path.

Here, the auxiliary transmission path is determined according to a backbone path between the first device and the second device and P backup sink nodes between the first device and the second device, P is a positive integer. The backbone path is a path between the second device and a previous sink node of a main congested sink node in the main transmission path, the main congested sink node is one of the M sink nodes which has the highest degree of congestion in the main transmission path. The P backup sink nodes are P backup sink node between the previous sink node of the main congested sink node and the first device.

It can be seen that according to the method for controlling data transmission described in the embodiments of the present disclosure, the first device sends a request for data transmission, receives a main transmission path that fed back by a second device based on the request, the main transmission path is generated by connecting M sink nodes between the first device and the second device and M is an integer greater than 1, and performs the data transmission with the second device according to the main transmission path. In such a manner, a data transmission path between the first device and the second device may be generated, and acceleration processing may be performed through the transmission path, so that rapid data transmission is ensured, a network environment is optimized, and a user experience is improved.

In a specific application, a communication connection may be established by the mobile terminal between the mobile terminal and the service platform to not only receive data sent by the service platform and but also send data of the mobile terminal, and the data may include, but not limited to image data, video data, voice data, text data and the like. Therefore, the mobile terminal implements data interaction with the service platform. However, when a network rate is relatively low, there may exist conditions of lag, disconnection or the like of a video, so that a user experience is reduced. Therefore, as illustrated in FIG. 1A, the embodiments of the present disclosure provide a network architecture diagram of a system for controlling data transmission for a method for controlling data transmission. Here, the mobile terminal establishes the communication connection with the service platform. On the basis of the system for controlling data transmission illustrated in FIG. 1A, the embodiments of the present disclosure provide a method for controlling data transmission, which includes that M sink nodes between a service platform and a mobile terminal are determined, here, M is an integer greater than 1; the M sink nodes are connected to generate a main transmission path between the service platform and the mobile terminal; and acceleration is started through the main transmission path to perform data transmission between the service platform and the mobile terminal.

It can be seen that according to the method for controlling data transmission described in the embodiments of the present disclosure, the M sink nodes between the service platform and the mobile terminal may be determined, here, M is an integer greater than 1, the M sink nodes are connected to generate the main transmission path between the service platform and the mobile terminal, and acceleration is started through the main transmission path to perform data transmission between the service platform and the mobile terminal. In such a manner, a data transmission path between the mobile terminal and the service platform may be generated, and acceleration processing may be performed through the transmission path, so that rapid data transmission is ensured, a network environment is optimized, and a user experience is improved.

Of course, the embodiments of the present disclosure may not only be adopted to implement game acceleration and but also be adopted to meet a downloading requirement of the mobile terminal. For example, when the mobile terminal uses a target game and the target game is in a game mode, the target game may establish a communication connection with a service platform corresponding to the target game. The target game may be set by a user or set by a system by default. Of course, the target game may also be a game running in a foreground. The target game may further be an online game. The online game requires more network resources as well as a good network environment, for example, whether a network is smooth and whether a signal is relatively strong. A single-player game has a certain requirement on performance of a Central Processing Unit (CPU), for example, whether a memory resource is met. The game mode may be a process of starting a game and entering a game environment or be in a game process, which will not be limited herein.

According to the embodiments above of the present disclosure, the method for controlling data transmission may be applied to a mobile terminal and a service platform. It is to be noted that the embodiments of the present invention are not limited thereto, and those skilled in the art may perform the method for controlling data transmission between other types of two devices (e.g., between mobile terminals, between services) according to the principles of the technical solutions provided by the embodiments of the present disclosures.

A method for controlling data transmission provided by the embodiments of the present disclosure and a device implementing the method for controlling data transmission will be described below.

Figure 1C:
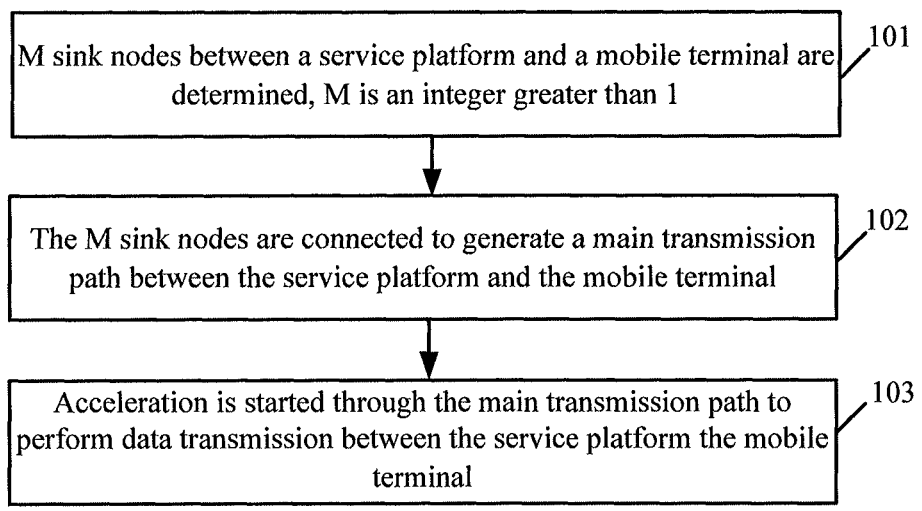
FIG. 1C is a flowchart of another method for controlling data transmission according to an embodiment of the present disclosure.

On the basis of a network architecture illustrated in FIG. 1A, a method for controlling data transmission as illustrated in FIG. 1C is provided. FIG. 1C illustrates a flowchart of an embodiment of another method for controlling data transmission according to an embodiment of the present disclosure. The method for controlling data transmission described in the embodiment includes the following operations.

In block 101, M sink nodes between a service platform and a mobile terminal are determined, here, M is an integer greater than 1.

Herein, multiple paths may be formed between the mobile terminal and the service platform. Of course, each transmission path has different performance and also achieves a different data transmission effect. In the present disclosure, the M sink nodes may be selected between the service platform and the mobile terminal, thereby forming a transmission path configured to implement data transmission, M is an integer greater than 1. For example, the M sink nodes may form a transmission path with the shortest transmission distance between the service platform and the mobile terminal. For another example, the M sink nodes may form a transmission path with the lowest data forwarding frequency between the service platform and the mobile terminal. For yet another example, the M sink nodes may form a transmission path with the lowest degree of congestion between the service platform and the mobile terminal. For still another example, the M sink nodes may be a transmission path with the highest stability between the service platform and the mobile terminal.

Optionally, the operation that the M sink nodes between the service platform and the mobile terminal are determined in block 101 may include the following operations.

In 11, N transmission paths between the service platform and the mobile terminal are determined, here, each of the N transmission paths includes multiple sink nodes and N is an integer greater than 1.

In 12, performance evaluation is performed on each of the N transmission paths to obtain N evaluation values.

In 13, the transmission path corresponding to a maximum of the N evaluation values is determined, and the multiple sink nodes in the transmission path corresponding to the maximum of the N evaluation values are determined as the M sink nodes.

Herein, there may be the N transmission paths between the service platform and the mobile terminal. Specifically, a path planning algorithm may be adopted for implementing the N transmission paths. Each of the N transmission paths may include multiple sink nodes, and each sink node has its own performance limitation, that is, each of the N transmission paths has its own performance limitation. Then, performance evaluation may be performed on each of the N transmission paths to obtain the N evaluation values, a maximum of the N evaluation values may be selected, and the transmission path corresponding to the maximum of the N evaluation values may be determined. Therefore, all the sink nodes in the transmission path corresponding to the maximum of the N evaluation values may be determined as the M sink nodes, and a main transmission path may be obtained according to the M sink nodes.

Furthermore, optionally, the operation that performance evaluation is performed on each of the N transmission paths in 12 may include the following operations.

In 121, performance parameters of all the sink nodes in a transmission path i are acquired, here, the transmission path i is any one of the N transmission paths.

In 122, performance evaluation is performed on the transmission path i according to the performance parameters.

Herein, the performance parameters may include at least one of a data receiving and sending frequency, a packet loss rate, an uplink data transmission rate, a downlink data transmission rate, a bearing bandwidth, the number of access users, the number of antennas or the like. Each sink node may correspond to multiple performance parameters, a weight value corresponding to each performance parameter is determined according to a preset mapping relationship between each performance parameter and a weight value, a weighting operation is performed on each performance parameter and a weight value corresponding to each performance parameter to obtain an evaluation value of each sink node, and an average of the evaluation values of all the sink nodes in a transmission path is taken as the evaluation value of the transmission path. For example, a transmission path includes sink nodes a1, a2 and a3. An evaluation value corresponding to the sink node a1 is 10.5, an evaluation value corresponding to the sink node a2 is 13, and an evaluation value corresponding to the sink node a3 is 9.5, and then an evaluation value of the transmission path is (10.5+13+9.5)/3=11. Therefore, the evaluation value of each transmission path may be determined according to the performance parameters of the sink nodes in the transmission path.

Optionally, before block 101, the method further includes the following operations.

In A1, a configuration parameter of a target game is received from the mobile terminal.

In A2, a network resource parameter of the mobile terminal is determined according to the configuration parameter.

Then, the operation that the M sink nodes between the service platform and the mobile terminal are determined in block 101 includes that the M sink nodes between the service platform and the mobile terminal are determined according to the network resource parameter.

Herein, the configuration parameter may include, but not limited to a resolution, a frame rate (frame number/second), a lowest frame rate, a game scenario, a memory size, a game progress and the like. The mobile terminal may acquire the configuration parameter of the target game at first and then send the configuration parameter of the target game to the service platform, the service platform may determine the network resource parameter of the mobile terminal according to the configuration parameter, and the network resource parameter may be at least one of a network transmission rate, a bandwidth resource, a network delay, a user number limitation or the like. For the service platform, different network resource parameters may be prepared for different mobile terminals. For example, a 5.3-inch mobile terminal and a 6.0-inch mobile terminal have different sizes of display screens and thus correspond to different network resource parameters. For another example, different mobile terminals require different frame rates and thus have different network resource parameters. Therefore, the service platform may further determine the M sink nodes between the service platform and the mobile terminal according to the network resource parameter. Different paths correspond to different network resource parameters, so that a requirement of the mobile terminal may be met as needed, and the service platform may create the main transmission path and start acceleration through the main transmission path to further implement data transmission between the service platform and the mobile terminal. A data type for data transmission may not only include video data but also include voice data, text data and the like. The target game may be set by a user or set by a system by a default. Of course, the target game may be a game running in a foreground. The target game may also be an online game. The online game requires more network resources as well as a good network environment, for example, whether a network is smooth and whether a signal is relatively strong. A single-player game has a certain requirement on performance of a CPU, for example, whether a memory resource is met. The game mode may be a process of starting the game and entering a game environment or be in a game process, which will not be limited herein.

Optionally, before block 101, the method may further include the following operations.

A game acceleration request sent by the mobile terminal is received, and the operation that the M sink nodes between the service platform and the mobile terminal are determined is executed.

Herein, the service platform may receive the game acceleration request sent by the mobile terminal and further determine the M sink nodes between the service platform and the mobile terminal in response to the game acceleration request.

In block 102, the M sink nodes are connected to generate a main transmission path between the service platform and the mobile terminal.

Herein, there are the M sink nodes between the service platform and the mobile terminal, and furthermore, the M sink nodes may be connected. Specifically, the M sink nodes may be sequentially connected to obtain the main transmission path according to a shortest path principle. In the embodiment of the present disclosure, the main transmission path may be a general transmission path and may also be a Virtual Private Network (VPN) transmission path.

In block 103, acceleration is started through the main transmission path to perform data transmission between the service platform and the mobile terminal.

Herein, acceleration may be started through the main transmission path. Specifically, a method for starting acceleration may be as follows: a user identity of the mobile terminal or the number of users is limited, or, CPU performance of the service platform is improved, or the like. For example, acceleration may be performed only for a specified user. For another example, the CPU performance of the service platform may be improved to start acceleration through the main transmission path.

It can be seen that according to the method for controlling data transmission described in the embodiment of the present disclosure, the M sink nodes between the service platform and the mobile terminal may be determined, M is an integer greater than 1, the M sink nodes are connected to generate the main transmission path between the service platform and the mobile terminal, and acceleration is started through the main transmission path to perform data transmission between the service platform and the mobile terminal. In such a manner, a data transmission path between the mobile terminal and the service platform may be generated, and acceleration processing may be performed through the transmission path, so that rapid data transmission is ensured, a network environment is optimized, and a user experience is improved.

Figure 2A:
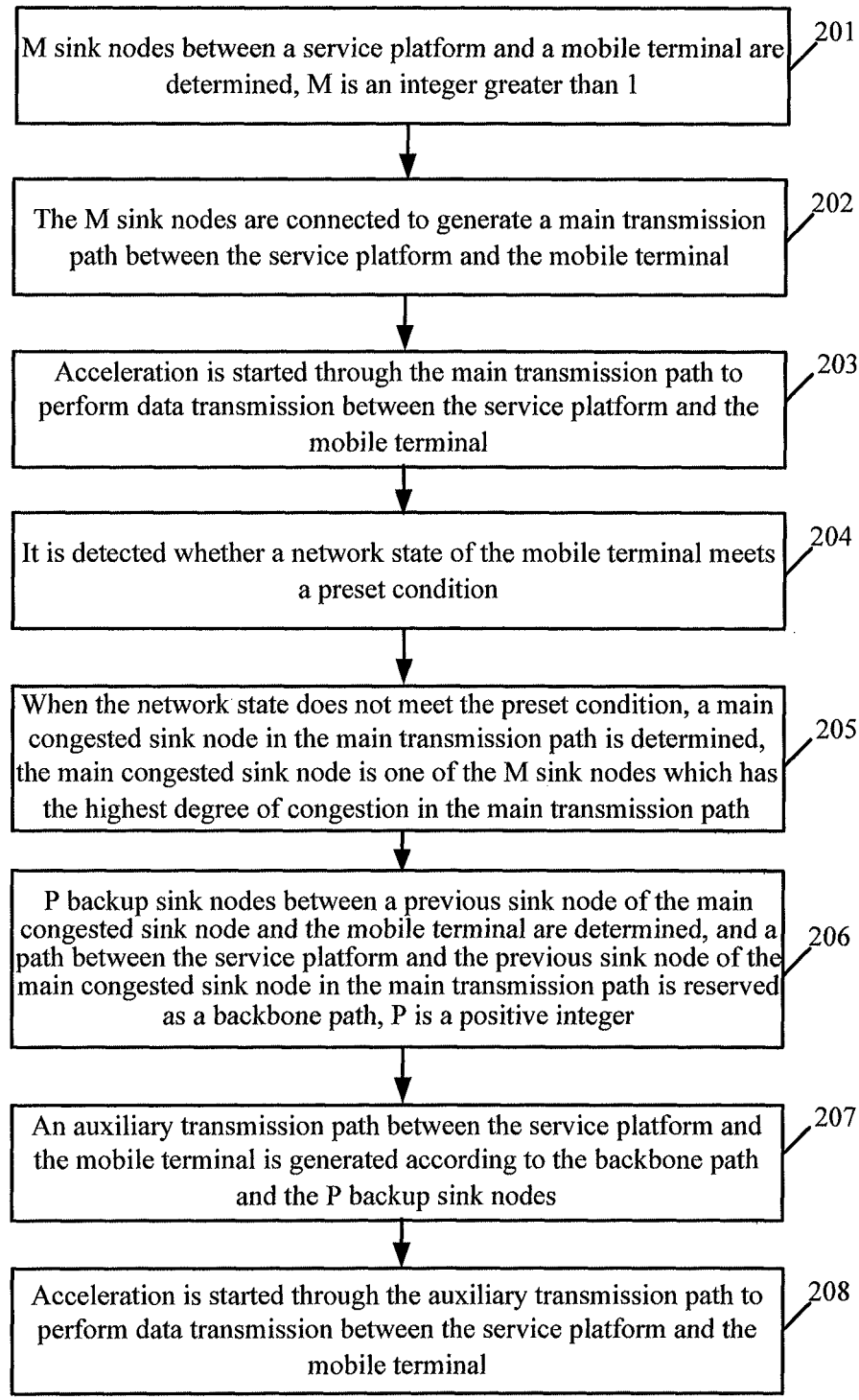
FIG. 2A is a flowchart of yet another method for controlling data transmission according to an embodiment of the present disclosure.

Referring to FIG. 2A, FIG. 2A illustrates a flowchart of an embodiment of yet another method for controlling data transmission according to an embodiment of the present disclosure. The method for controlling data transmission described in the embodiment includes the following operations.

In block 201, M sink nodes between a service platform and a mobile terminal are determined, here, M is an integer greater than 1.

In block 202, the M sink nodes are connected to generate a main transmission path between the service platform and the mobile terminal.

In block 203, acceleration is started through the main transmission path to perform data transmission between the service platform and the mobile terminal.

Herein, specific descriptions about blocks 201-203 may refer to the corresponding operations of the method for controlling data transmission illustrated in FIG. 1C and will not be elaborated herein.

In block 204, it is detected whether a network state of the mobile terminal meets a preset condition.

Herein, the service platform may send an acquisition request to the mobile terminal, the acquisition request is configured to acquire the network state of the mobile terminal, and the network state may include at least one of a network rate, a network delay, signal strength or the like. For example, the network rate may be a network rate when a target game is in a game mode. The preset condition may be that the network rate is higher than or equal to a preset network rate (the preset network rate may be set by a user or set by a system by a default), or, the mobile terminal is a mobile terminal consistent with a preset model (different models have different performance, and a model configuration may also be relatively poor, so that acceleration may not be implemented), or, the mobile terminal enables a Wireless Fidelity (Wi-Fi) acceleration switch.

In block 205, when the network state does not meet the preset condition, a main congested sink node in the main transmission path is determined, here, the main congested sink node is one of the M sink nodes which has the highest degree of congestion in the main transmission path.

Herein, when the network state does not meet the preset condition, the main congested sink node in the main transmission path may be determined, the main congested sink node is one of the M sink nodes which has the highest degree of congestion in the main transmission path, and after the main congested sink node is determined, it may be determined that the sink nodes after the main congested sink node are all relatively congested.

In block 206, P backup sink nodes between a previous sink node of the main congested sink node and the mobile terminal are determined, and a path between the service platform and the previous sink node of the main congested sink node in the main transmission path is reserved as a backbone path, here, P is a positive integer.

Herein, in addition to the M sink nodes corresponding to the main transmission path, other sink nodes may further be included between the mobile terminal and the service platform. Furthermore, the backup sink nodes between the previous sink node of the main congested sink node and the mobile terminal may be determined to obtain the P backup sink nodes, and the path between the service platform and the previous sink node of the main congested sink node in the main transmission path is reserved as the backbone path, P is a positive integer. The previous sink node of the main congested sink node may usually have a lower degree of congestion than the main congested sink node.

In block 207, an auxiliary transmission path between the service platform and the mobile terminal is generated according to the backbone path and the P backup sink nodes.

Herein, the auxiliary transmission path between the service platform and mobile terminal may be generated according to the backbone path and the P backup sink nodes, and the auxiliary transmission path has a lower degree of congestion than the original main transmission path to a certain extent, so that congestion may be alleviated to a certain extent, and a network environment may be further optimized.

In block 208, acceleration is started through the auxiliary transmission path to perform data transmission between the service platform and the mobile terminal.

Herein, acceleration may be started through the auxiliary transmission path. Specifically, a method for starting acceleration may be as follows: a user identity of the mobile terminal is limited, or, CPU performance of the service platform is improved, or the like. For example, acceleration may be performed only for a specified user. For another example, the CPU performance of the service platform may be improved to start acceleration through the auxiliary transmission path.

Optionally, the operation that acceleration is started through the auxiliary transmission path in block 208 may be implemented according to the following manner: acceleration is started through the auxiliary transmission path on the basis of the network state of the mobile terminal.

Herein, the network state of the mobile terminal corresponds to a network optimization direction between the mobile terminal and the service platform, a difference network parameter between the network state of the mobile terminal and a practically required network state may be determined, a target acceleration parameter corresponding to the auxiliary transmission path is determined according to a preset mapping relationship between a network parameter and an acceleration parameter, and the auxiliary transmission path is controlled to start acceleration according to the target acceleration parameter. The acceleration parameter may be at least one of a CPU performance improvement parameter (for example, multiple cores, a main frequency and freezing of a background application of the service platform), a channel parameter (for example, a channel to be selected), a channel frequency (spectrum shifting is performed on the channel to reduce interference) or the like.

Figure 2B:
FIG. 2B is a demonstration diagram of a transmission path according to an embodiment of the present disclosure.
Figure 2C:
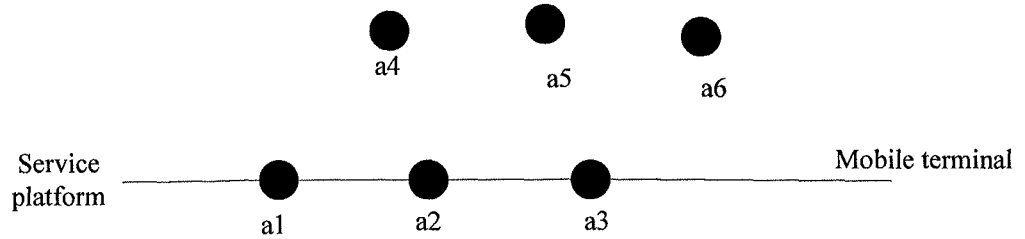
FIG. 2C is another demonstration diagram of a transmission path according to an embodiment of the present disclosure.
Figure 2D:
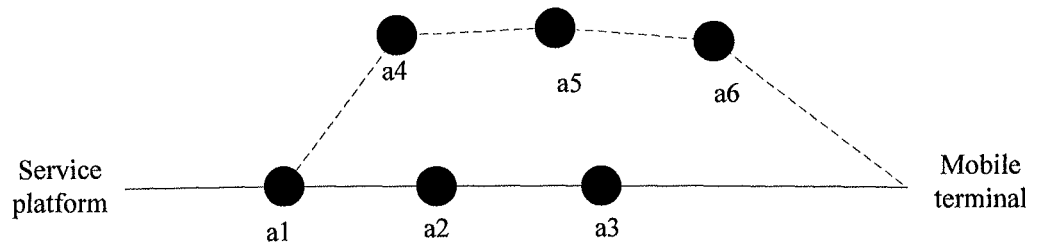
FIG. 2D is yet another demonstration diagram of a transmission path according to an embodiment of the present disclosure.

For example, as illustrated in FIG. 2B, there is provided a main transmission path between the service platform and the mobile terminal, in which a1, a2 and a3 are sink nodes. Furthermore, as illustrated in FIG. 2C, other sink nodes may further be included between the service platform and the mobile terminal, for example, a4, a5 and a6. Then, when a2 is a main congested node, a1 is a previous sink node of the main congested node, a backbone path is formed between the service platform and a1, and as illustrated in FIG. 2D, an auxiliary transmission path is formed among the service platform, a1, a4, a5, a6 and mobile terminal.

It can be seen that according to the method for controlling data transmission described in the embodiment of the present disclosure, the M sink nodes between the service platform and the mobile terminal may be determined, M is an integer greater than 1, the M sink nodes are connected to generate the main transmission path between the service platform and the mobile terminal, acceleration is started through the main transmission path to perform data transmission between the service platform and the mobile terminal. It is detected whether the network state of the mobile terminal meets the preset condition, the main congested sink node in the main transmission path is determined when the network state does not meet the preset condition, the main congested sink node is one of the M sink nodes which has the highest degree of congestion in the main transmission path. The P backup sink nodes between the previous sink node of the main congested sink node and the mobile terminal are determined, the path between the service platform and the previous sink node of the main congested sink node in the main transmission path is reserved as the backbone path, P is a positive integer, the auxiliary transmission path between the service platform and the mobile terminal is generated according to the backbone path and the P backup sink nodes, and acceleration is started through the auxiliary transmission path to perform data transmission between the service platform and the mobile terminal. In such a manner, a data transmission path between the mobile terminal and the service platform may be generated, and acceleration processing may be performed through the transmission path, so that rapid data transmission is ensured, and the network environment is optimized; and under the condition that the main transmission path is invalid, the auxiliary transmission path may be established to keep optimizing the network environment and improve a user experience.

Figure 3:
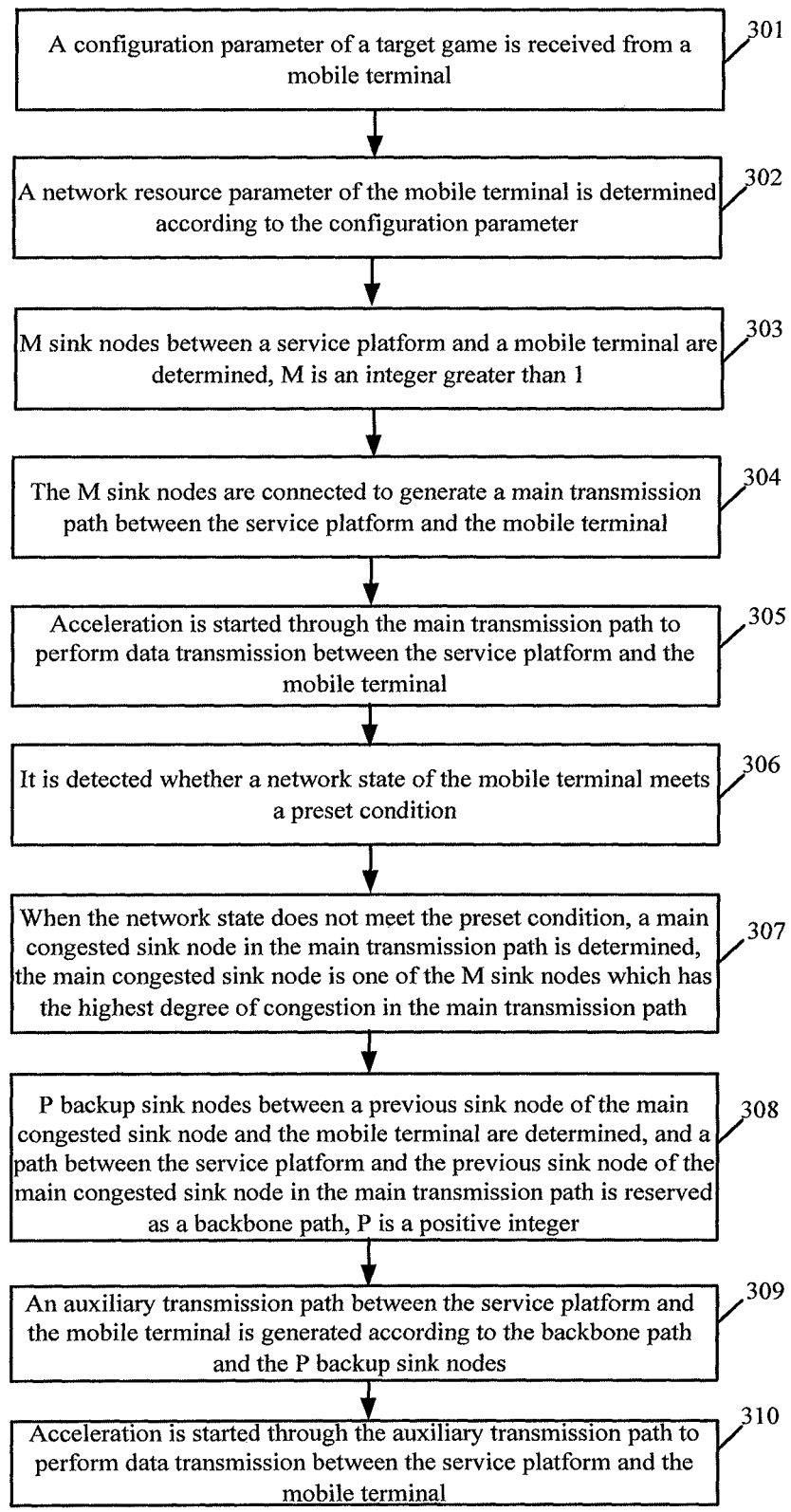
FIG. 3 is a flowchart of yet another method for controlling data transmission according to an embodiment of the present disclosure.

Referring to FIG. 3, FIG. 3 illustrates a flowchart of an embodiment of still another method for controlling data transmission according to an embodiment of the present disclosure. The method for controlling data transmission described in the embodiment includes the following operations.

In block 301, a configuration parameter of a target game is received from a mobile terminal.

In block 302, a network resource parameter of the mobile terminal is determined according to the configuration parameter.

In block 303, M sink nodes between a service platform and the mobile terminal are determined according to the network resource parameter, here, M is an integer greater than 1.

In block 304, the M sink nodes are connected to generate a main transmission path between the service platform and the mobile terminal.

In block 305, acceleration is started through the main transmission path to perform data transmission between the service platform and the mobile terminal.

In block 306, it is detected whether a network state of the mobile terminal meets a preset condition.

In block 307, when the network state does not meet the preset condition, a main congested sink node in the main transmission path is determined, here, the main congested sink node is one of the M sink nodes which has the highest degree of congestion in the main transmission path.

In block 308, P backup sink nodes between a previous sink node of the main congested sink node and the mobile terminal are determined, and a path between the service platform and the previous sink node of the main congested sink node in the main transmission path is reserved as a backbone path, here, P is a positive integer.

In block 309, an auxiliary transmission path between the service platform and the mobile terminal is generated according to the backbone path and the P backup sink nodes.

In block 310, acceleration is started through the auxiliary transmission path to perform data transmission between the service platform and the mobile terminal.

Herein, specific descriptions about blocks 301-310 may refer to the corresponding operations of the method for controlling data transmission illustrated in FIG. 1C and will not be elaborated herein.

It can be seen that according to the method for controlling data transmission described in the embodiment of the present disclosure, the M sink nodes between the service platform and the mobile terminal may be determined, M is an integer greater than 1, the M sink nodes are connected to generate the main transmission path between the service platform and the mobile terminal, and acceleration is started through the main transmission path to perform data transmission between the service platform and the mobile terminal. In such a manner, a data transmission path between the mobile terminal and the service platform may be generated, and acceleration processing may be performed through the transmission path, so that rapid data transmission is ensured, a network environment is optimized, and a user experience is improved.

Figure 4A:
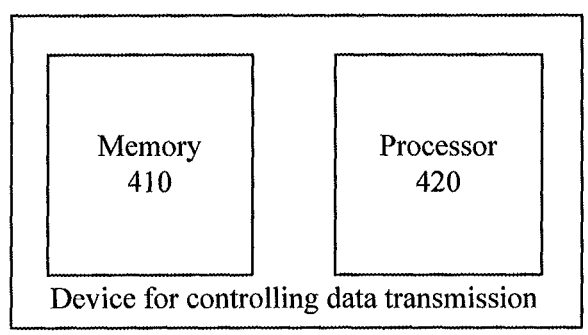
FIG. 4A is a structure diagram of a device for controlling data transmission according to an embodiment of the present disclosure.

FIG. 4A illustrates a structure diagram of a device for controlling data transmission according to an embodiment of the present disclosure. The device for controlling data transmission is for use in a first device, and includes a processor 420 and a memory 410 storing a computer program that when executed by the processor to cause the processor to implement the method for controlling data transmission provided by the embodiments of the present application, as illustrated in FIG. 1B.

Figure 4B:
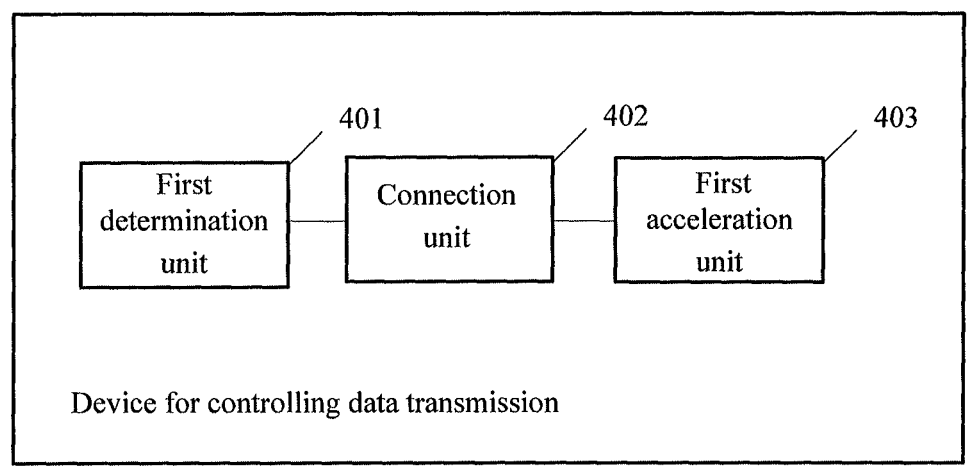
FIG. 4B is a structure diagram of another device for controlling data transmission according to an embodiment of the present disclosure.

FIG. 4B illustrates a structure diagram of another device for controlling data transmission according to an embodiment of the present disclosure. The device for controlling data transmission is for use in a mobile terminal, and the device for controlling data transmission may include a first determination unit 401, a connection unit 402 and a first acceleration unit 403.

Herein, the first determination unit 401 is configured to determine M sink nodes between a service platform and a mobile terminal. Here, M is an integer greater than 1.

The connection module 402 is configured to connect the M sink nodes to generate a main transmission path between the service platform and the mobile terminal.

The first acceleration unit 403 is configured to start acceleration through the main transmission path to perform data transmission between the service platform and the mobile terminal.

Figure 4C:
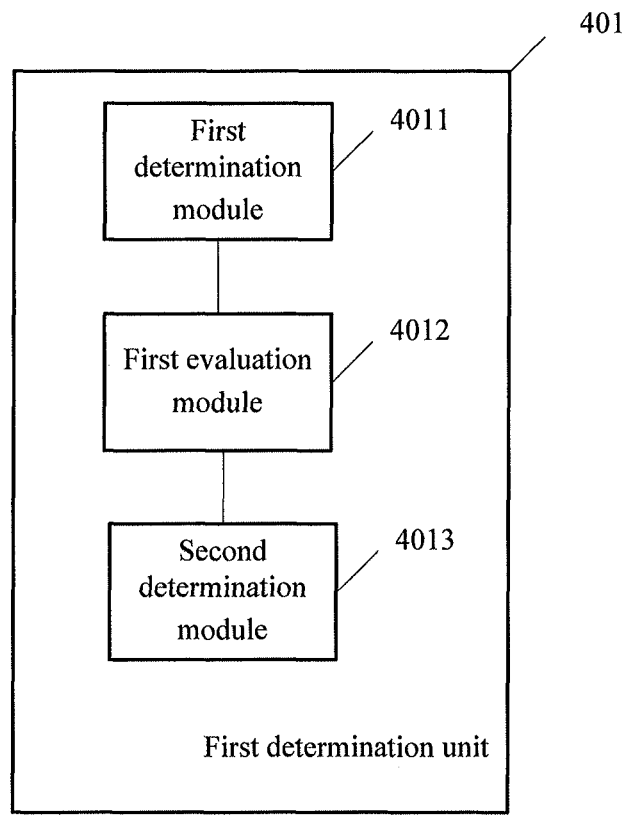
FIG. 4C is a structure diagram of a first determination unit of the device for controlling data transmission illustrated in FIG. 4B according to an embodiment of the present disclosure.

Optionally, as illustrated in FIG. 4C, FIG. 4C is a specific detailed structure of the first determination unit 401 of the device for controlling data transmission illustrated in FIG. 4B. The first determination unit 401 may include a first determination module 4011, a first evaluation module 4012 and a second determination module 4013, specifically as follows.

The first determination module 4011 is configured to determine N transmission paths between the service platform and the mobile terminal, here, each of the N transmission paths includes multiple sink nodes and N is an integer greater than 1.

The first evaluation module 4012 is configured to perform performance evaluation on each of the N transmission paths to obtain N evaluation values.

The second determination module 4013 is configured to determine the transmission path corresponding to a maximum of the N evaluation values, and determine the multiple sink nodes in the transmission path corresponding to the maximum of the N evaluation values as the M sink nodes.

Figure 4D:
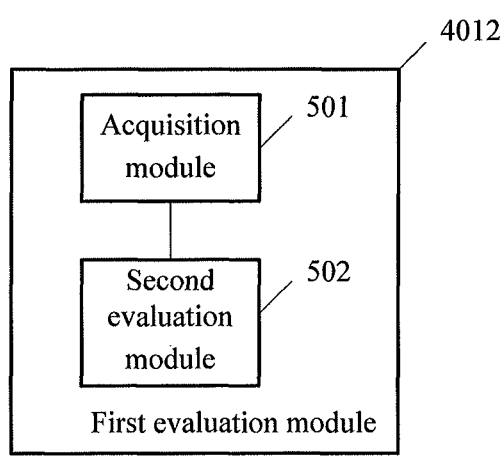
FIG. 4D is a structure diagram of a first evaluation module of the first determination unit illustrated in FIG. 4C according to an embodiment of the present disclosure.

Optionally, as illustrated in FIG. 4D, FIG. 4D is a specific detailed structure of the first evaluation module 4012 of the first determination unit 401 illustrated in FIG. 4C. The first evaluation module 4012 may include an acquisition module 501 and a second evaluation module 502, specifically as follows.

The acquisition module 501 is configured to acquire performance parameters of the multiple sink nodes in a transmission path i, here, the transmission path i is any one of the N transmission paths, each of the multiple sink node corresponds to multiple performance parameters and each of the multiple performance parameters corresponds to a weight value.

The second evaluation module 502 is configured to perform performance evaluation on the transmission path i according to the performance parameters.

The second evaluation module is further configured to: for each of the multiple sink nodes in the transmission path i, determine an evaluation value of each of the multiple sink nodes by performing a weighting operation on each of the multiple performance parameters and a weight value corresponding to each of the multiple performance parameters; and determine an average of the evaluation values of the multiple sink nodes in the transmission path i as an evaluation value of the transmission path i.

Figure 4E:
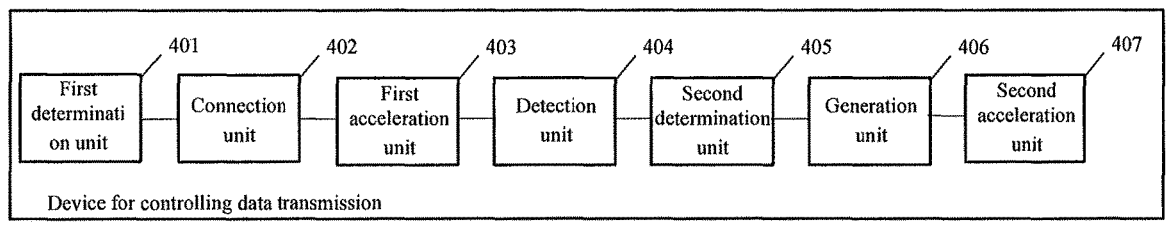
FIG. 4E is another structure diagram of the device for controlling data transmission illustrated in FIG. 4B according to an embodiment of the present disclosure.

Optionally, as illustrated in FIG. 4E, FIG. 4E is a transformed structure of the device for controlling data transmission illustrated in FIG. 4B. Compared with FIG. 4B, the device in FIG. 4E may further include: a detection unit 404, a second determination unit 405, a generation unit 406 and a second acceleration unit 407, specifically as follows.

The detection unit 404 is configured to detect whether a network state of the mobile terminal meets a preset condition.

The second determination unit 405 is configured to, when the network state does not meet the preset condition, determine a main congested sink node in the main transmission path, the main congested sink node is one of the M sink nodes which has the highest degree of congestion in the main transmission path, determine P backup sink nodes between a previous sink node of the main congested sink node and the mobile terminal, and reserve as a backbone path a path between the service platform and the previous sink node of the main congested sink node in the main transmission path, P is a positive integer.

The generation unit 406 is configured to generate an auxiliary transmission path between the service platform and the mobile terminal according to the backbone path and the P backup sink nodes.

The second acceleration unit 407 is configured to start acceleration through the auxiliary transmission path to perform data transmission between the service platform and the mobile terminal.

Figure 4F:
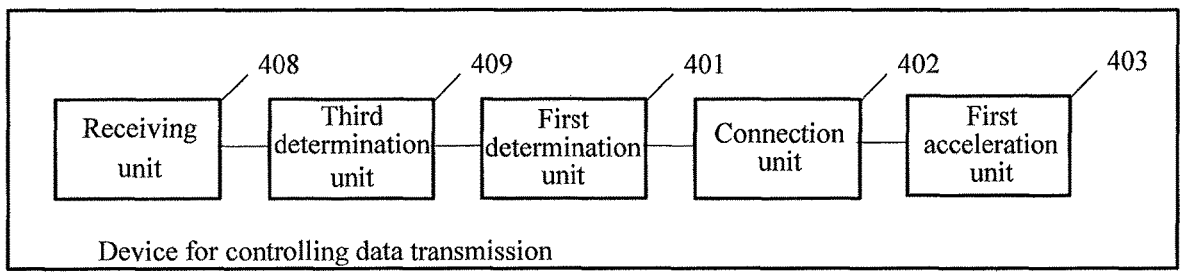
FIG. 4F is yet another structure diagram of the device for controlling data transmission illustrated in FIG. 4B according to an embodiment of the present disclosure.

Optionally, as illustrated in FIG. 4F, FIG. 4F is a transformed structure of the device for controlling data transmission illustrated in FIG. 4B. Compared with FIG. 4B, the device in FIG. 4F may further include: a receiving unit 408 and a third determination unit 409, specifically as follows.

The receiving unit 408 is configured to receive a configuration parameter of a target game from the mobile terminal.

The third determination unit 409 is configured to determine a network resource parameter of the mobile terminal according to the configuration parameter.

The first determination unit 401 is further configured to determine the M sink nodes between the service platform and the mobile terminal according to the network resource parameter.

It can be seen that the devices for controlling data transmission described in the embodiments of the present disclosure may determine the M sink nodes between the service platform and the mobile terminal, M is an integer greater than 1, connect the M sink nodes to generate the main transmission path between the service platform and the mobile terminal, and start acceleration through the main transmission path to perform data transmission between the service platform and the mobile terminal. In such a manner, a data transmission path between the mobile terminal and the service platform may be generated, and acceleration processing may be performed through the transmission path, so that rapid data transmission is ensured, a network environment is optimized, and a user experience is improved.

It is to be noted that the devices for controlling data transmission described in the device embodiments of the present disclosure are presented in form of functional unit. Term "unit" used herein should be understood as a meaning which is as broad as possible and an object configured to realize a described function of each "unit" may be, for example, an Application Specific Integrated Circuit (ASIC), a single circuit, a processor (shared, dedicated or chipset) and memory configured to execute one or more software or firmware programs, a combined logical circuit and/or other proper components realizing the functions.

Figure 5:
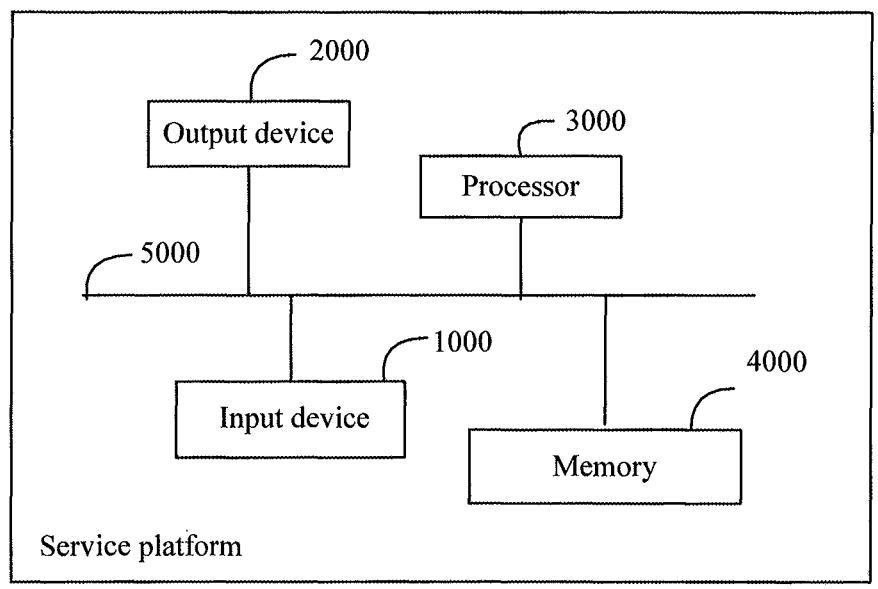
FIG. 5 is a structure diagram of a service platform according to an embodiment of the present disclosure.

For example, a function of the first determination unit 401 in determining the M sink nodes between the service platform and the mobile terminal may be realized by the service platform illustrated in FIG. 5, and specifically, a processor 3000 may call an executable program code in a memory 4000 to determine the M sink nodes between the service platform and the mobile terminal.

Referring to FIG. 5, FIG. 5 illustrates a structure diagram of an embodiment of a service platform according to an embodiment of the present disclosure. The service platform described in the embodiment includes at least one input device 1000, at least one output device 2000, at least one processor 3000, for example, a CPU, and a memory 4000. Herein, the input device 1000, the output device 2000, the processor 3000 and the memory 4000 are connected through a bus 5000.

Herein, the input device 1000 may specifically be a touch panel, a physical button or a mouse.

The output device 2000 may specifically be a display screen.

The memory 4000 may be a high-speed Random Access Memory (RAM) and may also be a non-volatile memory, for example, a disk memory. The memory 4000 is configured to store a group of program codes. The input device 1000, the output device 2000 and the processor 3000 are configured to call the program codes stored in the memory 4000 to execute the following operations that M sink nodes between a service platform and a mobile terminal are determined, here, M is an integer greater than 1; the M sink nodes are connected to generate a main transmission path between the service platform and the mobile terminal; and acceleration is started through the main transmission path to perform data transmission between the service platform and the mobile terminal.

Optionally, the processor 3000 is further specifically configured to determine N transmission paths between the service platform and the mobile terminal, here, each of the N transmission paths includes multiple sink nodes and N is an integer greater than 1; perform performance evaluation on each of the N transmission paths to obtain N evaluation values; and determine the transmission path corresponding to a maximum of the N evaluation values, and determine the multiple sink nodes in the transmission path corresponding to the maximum of the N evaluation values as the M sink nodes.

Optionally, the processor 3000 is further specifically configured to acquire performance parameters of the multiple sink nodes in a transmission path i, here, the transmission path i is any one of the N transmission paths, each of the multiple sink node corresponds to multiple performance parameters and each of the multiple performance parameters corresponds to a weight value; and perform performance evaluation on the transmission path i according to the performance parameters.

Optionally, the processor 3000 is further specifically configured to, for each of the multiple sink nodes in the transmission path i, determine an evaluation value of each of the multiple sink nodes by performing a weighting operation on each of the multiple performance parameters and a weight value corresponding to each of the multiple performance parameters; and determine an average of the evaluation values of the multiple sink nodes in the transmission path i as an evaluation value of the transmission path i.

Optionally, the processor 3000 is further specifically configured to detect whether a network state of the mobile terminal meets a preset condition; when the network state does not meet the preset condition, determine a main congested sink node in the main transmission path, the main congested sink node is one of the M sink nodes which has the highest degree of congestion in the main transmission path; determine P backup sink nodes between a previous sink node of the main congested sink node and the mobile terminal and reserve as a backbone path a path between the service platform and the previous sink node of the main congested sink node in the main transmission path, P is a positive integer; generate an auxiliary transmission path between the service platform and the mobile terminal according to the backbone path and the P backup sink nodes; and start acceleration through the auxiliary transmission path to perform data transmission between the service platform and the mobile terminal.

Optionally, the processor 3000 is further specifically configured to receive a configuration parameter of a target game from the mobile terminal; determine a network resource parameter of the mobile terminal according to the configuration parameter; and determine the M sink nodes between the service platform and the mobile terminal according to the network resource parameter.

An embodiment of the present disclosure further provides a non-transitory computer storage medium having stored thereon a computer program that when executed by a processor, cause the processor to implement the methods for controlling data transmission recited in the abovementioned method embodiments.

An embodiment of the present disclosure further provides a computer program product, which includes a non-transitory computer-readable storage medium storing a computer program that when executed by a processor, cause the processor to implement the methods for controlling data transmission recited in the abovementioned method embodiments.

It is to be noted that, for simple description, each method embodiment is expressed into a combination of a series of actions. However, those skilled in the art should know that the present disclosure is not limited by an action sequence described herein because some operations may be executed in another sequence or at the same time according to the present disclosure. Those skilled in the art should also know that the embodiments described in the specification all belong to preferred embodiments and involved actions and modules are not always necessary to the present disclosure.

Each embodiment in the abovementioned embodiments is described with different emphases, and undetailed parts in a certain embodiment may refer to related descriptions in the other embodiments.

In some embodiments provided by the present disclosure, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected or not executed. In addition, the illustrated or discussed coupling or direct coupling or communication connection with each other may be indirect coupling or communication connection through some interfaces, devices or units, and may be electrical or other forms.

The units described as separate parts may or may not be physically separated, and parts displayed as units may or may not be physical units, namely, may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more units may also be integrated into a unit. The integrated unit may be implemented in a hardware form and may also be implemented in form of software program module.

The integrated unit, when being implemented in form of software program module and sold or used as an independent product, may be stored in a computer-readable memory.

Based on such an understanding, the essence of the technical solutions of the present disclosure or parts making contributions to the related art or all or part of the technical solutions may be embodied in form of software product, and the computer software product is stored in a memory, including multiple instructions configured to enable a piece of computer equipment (which may be a personal computer, a server, network equipment or the like) to execute all or part of the operations of the method in each embodiment of the present disclosure. The memory includes various media capable of storing program codes, such as a U disk, a Read-Only Memory (ROM), a RAM, a mobile hard disk, a magnetic disk or an optical disk.

Those of ordinary skilled in the art can understand that all or part of the operations in various methods of the embodiments may be completed by related hardware instructed by a program, the program may be stored in a computer-readable memory, and the memory may include a flash disk, a ROM, a RAM, a magnetic disk, an optical disk or the like.

The embodiments of the present disclosure are introduced above in detail, the principle and implementations of the present disclosure are elaborated with specific examples herein, and the descriptions made to the embodiments are only adopted to understand the method of the present disclosure and the core concept thereof. In addition, those of ordinary skilled in the art may make variations to the specific implementations and the present disclosure scope according to the concept of the present disclosure. From the above, the contents of the specification should not be understood as limits to the present disclosure.

The invention claimed is:

1. A method for controlling data transmission, the method being applied to a first device and the method comprising:
   sending a request for data transmission;
   receiving a main transmission path that is fed back by a second device based on the request, the main transmission path being generated by connecting M sink nodes between the first device and the second device and M being an integer greater than 1;
   performing the data transmission with the second device according to the main transmission path; and
   when a network state of the first device does not meet a preset condition, receiving an auxiliary transmission path fed back by the second device, and performing the data transmission with the second device according to the auxiliary transmission path;
   wherein the auxiliary transmission path is determined according to a backbone path between the first device and the second device and P backup sink nodes between the first device and the second device, P being a positive integer;
   the backbone path is a path between the second device and a previous sink node of a main congested sink node in the main transmission path, the main congested sink node is one of the M sink nodes which has the highest degree of congestion in the main transmission path; and
   the P backup sink nodes are P backup sink nodes between the previous sink node of the main congested sink node and the first device.

2. The method of claim 1, wherein there are N transmission paths between the first device and the second device, each of the N transmission paths comprises a plurality of sink nodes and has a performance evaluation value, and N is an integer greater than 1;
   wherein the M sink nodes between the first device and the second device are the plurality of sink nodes in a transmission path, that has a maximum performance evaluation value, of the N transmission paths.

3. The method of claim 2, wherein the performance evaluation value of each transmission path is determined according to performance parameters of the plurality of sink nodes in the transmission path.

4. The method of claim 3, wherein the performance parameters comprise at least one of a data receiving and sending frequency, a packet loss rate, an uplink data transmission rate, a downlink data transmission rate, a bearing bandwidth, the number of access users, or the number of antennas.

5. The method of claim 1, wherein the request for data transmission includes a configuration parameter of a target game; and
   receiving the main transmission path that is fed back by the second device based on the request comprises:
   receiving the main transmission path that is fed back by the second device according to the configuration parameter, the main transmission path is generated by connecting the M sink nodes, which are determined according to a network resource parameter, between the first device and the second device, the network resource parameter is determined according to the configuration parameter.

6. The method of claim 1, wherein performing the data transmission with the second device according to the main transmission path comprises: establishing a communication connection with the second device according to the main transmission path to implement the data transmission with the second device.

7. The method of claim 1, wherein the first device is a mobile terminal, and the second device is a device for providing or forwarding services to the mobile terminal.

8. A first device for controlling data transmission, the first device comprising: a processor and a memory storing a computer program that, when executed by the processor, causes the processor to:
   send a request for data transmission;
   receive a main transmission path that is fed back by a second device based on the request, the main transmission path being generated by connecting M sink nodes between the first device and the second device, and M being an integer greater than 1;
   perform the data transmission with the second device according to the main transmission path; and
   when a network state of the first device does not meet a preset condition, receiving an auxiliary transmission path fed back by the second device, and perform the data transmission with the second device according to the auxiliary transmission path;
   wherein the auxiliary transmission path is determined according to a backbone path between the first device and the second device and P backup sink nodes between the first device and the second device, P being a positive integer;
   the backbone path is a path between the second device and a previous sink node of a main congested sink node in the main transmission path, the main congested sink node is one of the M sink nodes which has the highest degree of congestion in the main transmission path; and
   the P backup sink nodes are P backup sink nodes between the previous sink node of the main congested sink node and the first device.

9. The first device of claim 8, wherein there are N transmission paths between the first device and the second device, each of the N transmission paths comprises a plurality of sink nodes and has a performance evaluation value, and N is an integer greater than 1;

wherein the M sink nodes between the first device and the second device are the plurality of sink nodes in a transmission path, that has a maximum performance evaluation value, of the N transmission paths.

10. The first device of claim 9, wherein the performance evaluation value of each transmission path is determined according to performance parameters of the plurality of sink nodes in the transmission path.

11. The first device of claim 10, wherein the performance parameters comprise at least one of a data receiving and sending frequency, a packet loss rate, an uplink data transmission rate, a downlink data transmission rate, a bearing bandwidth, the number of access users, or the number of antennas.

12. The first device of claim 8, wherein the request for data transmission includes a configuration parameter of a target game; and the processor is further configured to receive the main transmission path that is fed back by the second device according to the configuration parameter, the main transmission path is generated by connecting the M sink nodes, which are determined according to a network resource parameter, between the first device and the second device, the network resource parameter is determined according to the configuration parameter.

13. The first device of claim 8, wherein the processor is further configured to establish a communication connection with the second device according to the main transmission path to implement the data transmission with the second device.

14. They first device of claim 8, wherein the first device is a mobile terminal, and the second device is a device for providing or forwarding services to the mobile terminal.

15. A non-transitory computer-readable storage medium having stored thereon a computer program that, when executed by a processor of a first device, causes the processor to implement a method for controlling data transmission, the method comprising:

sending a request for data transmission;

receiving a main transmission path that is fed back by a second device based on the request, the main transmission path being generated by connecting M sink nodes between the first device and the second device, and M being an integer greater than 1;

performing the data transmission with the second device according to the main transmission path, and when a network state of the first device does not meet a preset condition, receiving an auxiliary transmission path fed back by the second device, and performing the data transmission with the second device according to the auxiliary transmission path;

wherein the auxiliary transmission path is determined according to a backbone path between the first device and the second device and P backup sink nodes between the first device and the second device, P being a positive integer;

the backbone path is a path between the second device and a previous sink node of a main congested sink node in the main transmission path, the main congested sink node is one of the M sink nodes which has the highest degree of congestion in the main transmission path; and the P backup sink nodes are P backup sink nodes between the previous sink node of the main congested sink node and the first device.

16. The non-transitory computer-readable storage medium of claim 15, wherein there are N transmission paths between the first device and the second device, each of the N transmission paths comprises a plurality of sink nodes and has a performance evaluation value, and N is an integer greater than 1;

wherein the M sink nodes between the first device and the second device are the plurality of sink nodes in a transmission path, that has a maximum performance evaluation value, of the N transmission paths.

17. The non-transitory computer-readable storage medium of claim 15, wherein the first device is a mobile terminal, and the second device is a device for providing or forwarding services to the mobile terminal.

\* \* \* \* \*